(12) United States Patent
Li et al.

(10) Patent No.: US 6,868,347 B2
(45) Date of Patent: Mar. 15, 2005

(54) SYSTEM FOR REAL TIME, NON-INVASIVE METROLOGY OF MICROFLUIDIC CHIPS

(75) Inventors: Guann-Pyng Li, Irvine, CA (US); Mark Bachman, Irvine, CA (US); Zhongping Chen, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 42 days.

(21) Appl. No.: 10/393,109

(22) Filed: Mar. 19, 2003

(65) Prior Publication Data

US 2003/0229459 A1 Dec. 11, 2003

Related U.S. Application Data

(60) Provisional application No. 60/365,284, filed on Mar. 19, 2002.

(51) Int. Cl.[7] .............................................. G01N 11/00
(52) U.S. Cl. ...................................................... 702/50
(58) Field of Search ............................ 702/45, 49, 50, 702/100; 600/425, 473, 476

(56) References Cited

U.S. PATENT DOCUMENTS 6,208,415 B1 * 3/2001 De Boer et al. ............ 356/450
6,549,801 B1 * 4/2003 Chen et al. ................. 600/425
2003/0218756 A1 * 11/2003 Chen et al. ................. 356/497

OTHER PUBLICATIONS

60/349,086, Chen et al., Jan. 16, 2002.*
60/349,938, Chen et al., Jan. 18, 2002.*

* cited by examiner

Primary Examiner—Michael Nghiem
(74) Attorney, Agent, or Firm—Daniel L. Dawes; Myers Dawes Andras & Sherman LLP

(57) ABSTRACT

A system integration of multicomponent technologies includes an automated microfluidic probe station and the use of that station for the systematic study of nonideal, nonhomogeneous biological fluids such as blood in microfluidic chips. The probe station provides for real-time, non-invasive metrology of microfluidic chips employing optical coherence tomography and optical Doppler tomography to allow for collection of flow data at any location or depth within a microfluidics chip. Also included is a programmable fluidic loader and actuator platform as part of the probe station, and a semi-automated rapid prototyping tool used to fabricate the microfluidic chips measured on the probe station. The resulting data library produced by measurements on the probe station contains all the necessary information needed to develop mature, accurate microfluidic modeling and simulation CAD tools.

10 Claims, 16 Drawing Sheets

SYSTEM FOR REAL TIME, NON-INVASIVE METROLOGY OF MICROFLUIDIC CHIPS

This application claims the benefit of provisional application No. 60/365,284 filed on Mar. 19, 2002.

BACKGROUND OF THE INVENTION

1. Field of the Invention

The invention is directed to the field of rapid prototyping, testing, characterizing and archiving performance parameters of microbiochips using actual body fluids.

2. Description of the Prior Art

In all fields of engineering practice, designers rely on common tools to efficiently design and produce functional working pieces. These tools include standardized manufacturing techniques, fully developed design rules and principles, databases of material properties, and visualization tools. In the past 30 years, most of these tools have been integrated into one delivery system, namely the computer. Computer aided design, in the form of modeling and simulation, is the predominant mode for performing complex engineering design.

Unfortunately for biofluidic technologies, these tools are in their infancy. Although the fundamental physics of small-scale fluidic flow is understood, the physical phenomena which occur due to surface effects, electronic effects, chemical effects, non-homogeneous media, and other deviations from a perfect system are not well known or understood. Several simulation packages exist which claim to accurately model microfluidic systems. However, given the limited number of complex microfluidic systems which have been developed and the corresponding lack of data thus far, it is unlikely that current packages will adequately serve a future industry based on complex integrated biofluidic systems. The most likely scenario is that simulation packages will evolve with the industry as more devices are built, more materials and designs are attempted, and more data is collected.

Of particular interest is the nature of biological fluid flow, where we can expect the complex behavior to be very pronounced. Biological fluids, such as blood and lipid-rich fluids are highly non-ideal, nonhomogeneous, and may be reactive to the surfaces within a microfluidic system. Fluid particulates (e.g., cells) may aggregate and affect the flow through components in ways which are not well modeled with ideal fluids such as water. Furthermore, the internal dynamics of soft, non-spherical particles in the system will dramatically alter the nature of the fluid flow. We can expect the existence of internal fluidic constituents to strongly affect the behavior of fluids in systems with low Reynolds number, where internal forces dominate and inertial effects are negligible.

Heretofore, there is very little data on the nature of non-ideal fluid flow in complex microfluidic systems, particularly systems likely to be used for biofluidic chips. Data that exists is typically suited only to the specific invention of interest, and not easily compared between one study to the next. Few, if any, studies exist which present quantitative information about the flow characteristics in fluidic systems where key design variables have been systematically varied. No doubt this is due to the relative difficulty in producing many custom microfluidic chips as well as the difficulty in obtaining detailed, high resolution flow data from within such chips.

Most measurements in microfluidic devices have been limited to bulk properties of ideal fluid flow, such as wall pressure, bulk velocity, and specific impulse. Moreover, most measurements have been for simple systems (such as capillaries), or as part of a performance characterization for a device. Reports of full three dimensional mapping of velocity fields are rare, especially for microfluidic devices.

In cases where velocity fields have been measured, the measurements have been limited to ideal fluids in simple channels primarily using particle image tracing techniques. In practice, image streaks are difficult to analyze numerically. Velocity measurements determined from particle streaks are less reliable and are about ten times less accurate than pulsed velocimetry measurements. Many published results have been made to demonstrate a particular method or measurement, rather than as an attempt to perform a thorough study of flow characteristics.

Work in optical Doppler tomography, ODT, has been reported by other groups, but the efforts have been focused mainly on characterizing flow in animal tissues. Moreover, current ODT (sometimes referred to as CDOCT, color Doppler optical coherence tomography) efforts demonstrate image resolution which is on the order of 20 µm, with scan times measured in minutes. This quality is not sufficiently good to be adapted to the needs of microfluidic chip characterization.

Blood flow in capillary systems continues to be the subject of extensive in vivo and in vitro clinical and physiological research. However, it is widely believed that experimental work has been constrained by the limitations of currently available techniques capable of resolving cellular flow behavior. Blood is a complex fluid consisting of a liquid phase, the plasma, with included bodies, the cells. The effective viscosity of whole blood is a non-linear function of flow rate. At low flow rates the viscosity is dominated by erythrocyte (red cell) aggregation. At higher flow rates, deformation of the soft erythrocytes under flow cause a change in viscosity. The large fraction of blood represented by the cells (40%–50% by volume) and their intrinsic ability to radically deform under flow conditions make this a major non-linear effect.

The erythrocyte's morphology, an underfilled, supple, membrane sack enclosing a non-nucleated fluid stroma, facilitates the erythrocyte's deformation from their static, 8 µm diameter biconcave discoid shape, to a streamlined, flow-oriented, form at high fluid shear rates (>50/sec). This results in a reduction of their flow resistance and consequently a reduction in the viscosity of the whole blood.

Ideal fluids lend little to the understanding of blood flow in microscopic systems. Within microscopic channels and orifices, individual cells must mechanically deform to pass serially through passages. Rigid cells or contaminant particles can cause clogging and blocking within microscopic components, and most certainly modify the intended behavior of the components. Even steady state flow in blood is a complicated state, consisting of an interplay between the restoring forces exerted by the deformed cells, the fluid flow of a thin lubricating layer between the cell and channel walls, and biosurface interactions between the cell membrane and the channel wall. Blood flow in the microscopic regime cannot be treated as that of an ideal or homogeneous liquid.

Given that most data are for simple systems (such as channels), for ideal fluids (such as water), and of only bulk properties (such as flow vs. pressure), there is a need for a tool with which actual blood flow can be studied. Such data are of the most relevant to the design and integration of complex microfluidic systems.

Most measurements in microfluidic devices have been limited to bulk properties of ideal fluid flow, such as friction factors, wall pressure, bulk velocity, and specific impulse. Moreover, most measurements have been for simple systems (such as capillaries), or as part of a performance characterization for a specific, novel invention.

In cases where velocity fields have been measured, the measurements have been limited to ideal fluids in simple channels primarily using particle image tracing techniques. In practice, image streaks are difficult to analyze numerically. Velocity measurements determined from particle streaks are less reliable and are about ten times less accurate than pulsed velocimetry measurements. Many published results have been made to demonstrate a particular method, rather than as an attempt to perform a thorough study of flow characteristics.

Typical are the following examples. Brody et al. "*Biotechnology at Low Reynolds Numbers,*" Biophys J 71: 3430 D3441 (1996) used an intensified CCD camera to image particle streaks in an 11 $\mu$m by 72 $\mu$m (cross section) silicon channel. Also, lanzilloto et al. "*A Study of Structure and Motion in Fluidic Microsystems,*" AIAA (1997) used X-ray micro-imaging techniques to measure velocity fields in 500–1000 $\mu$m diameter micro-tubes by recording the motion of 1–20 $\mu$m emulsion droplets in a liquid flow. Velocity fields were estimated by tracking the trajectories of the emulsion droplets over time. They reported mean velocity fields in an 840 $\mu$m diameter tube, with vector-vector spacings of about 40 $\mu$m and axial bulk velocities of 7–14 $\mu$m/s.

A high resolution system for imaging particle traces has also been demonstrated. The results were for a two dimensional flow of water between two glass slides and served mostly to demonstrate the capability of a particular device.

A two-laser fluorescence-based imaging technique was recently demonstrated Arnold et. al., "*Fluorescence based Visualization of Electroosmotic Flow in Microfabricated Systems,*" SPIE Conference on Microfluidic Devices and Systems II, Vo. 3877 (1999). This technique used a fluorescent tracer which was created by photoactivation of a caged fluorescein dye. The dye was uncaged using the first laser to the effect of optically 'injecting' a narrow band of fluorescent material into the flow channel. A second laser was used to excite the uncaged dye molecules for mapping the flow image. Like other imaging-based methods, this technique suffers from a difficulty in determining quantitative data for velocity fields, and is limited two dimensional imaging in optically transparent media.

A study by Bousse et al "*Optimization of Sample Injection Components in Electrokinetic Microfluidic Systems*", IEEE Press (1999) studied the electro-osmotic flow within a capillary electrophoresis chip, and compared the results to calculations from a microfluidic simulation package (Microcosm's FlumeCAD). A series of experiments were performed where voltages were varied and subsequent flow observed. Images were qualitatively compared with modeling results, and the bulk flow velocity was measured. The results served to verify the quality of modeling. The authors did not perform a systematic study of effects of different channel designs and geometries, nor attempt to determine detailed flow profiles.

Currently, there is very little data on the nature of non-ideal fluid flow in complex microfluidic systems, particularly systems likely to be used for biofluidic chips. Data that exists is typically suited only to the specific application of interest, and not easily compared between one study to the next. Few, if any, studies exist which present quantitative information about the flow characteristics in fluidic systems where key design variables have been systematically varied. No doubt this is due to the relative difficulty in producing many custom microfluidic chips as well as the difficulty in obtaining detailed, high resolution flow data from within such chips.

A great deal of work has been done in two-dimensional array bio-fluidic systems implemented in silicon, glass, ceramic and plastics to investigate fluidic chip fabrication methods, study the flow behavior of ideal fluids, and to integrate the fluidic chip with electronics. However, only limited information is available dealing with the non-ideal inhomogeneous biological fluids such as blood. Furthermore, very few have reported constructing and characterizing three-dimensional (laminated) Bio-Flips, investigating the flow behavior in each layer, and integrating various active components. As the two-dimensional Bio-Flips technology matures for serial processing of samples, complex three-dimensional Bio-Flips technology will be the next wave for large scale parallel processing of samples and more sophisticated analysis chips with higher functionality.

For complex three dimensional biofluidic chips to be a manufacturable technology, they must allow for testing and evaluation during and after the production process. Acceptable production yield and quality control require early detection of flaws or processing problems. Within the microelectronics industry, for example, test circuits are built into the wafer for wafer-level testing. During packaging, the devices themselves are often tested to ensure high quality products, and to satisfy many design specifications, such as those required for military uses (e.g., MIL specs). Often testing is done on a representative sample under extreme conditions to satisfy quality criteria.

Unlike microelectronic devices, microfluidic devices cannot be easily probed. While a simple contact from an external probing conductor to a conducting trace allows one to make an electrical measurement without destroying the device, an analogous measurement for a microfluidic channel requires one to puncture the microchannel, thus destroying it in the process.

Therefore, what is needed instead is a non-invasive technique to allow a similar test functionality within microfluidic chips using actual body fluids.

BRIEF SUMMARY OF THE INVENTION

The invention is a system integration of multicomponent technologies in microfluidic systems. The invention includes the development of a sophisticated, automated microfluidic probe station and the subsequent use of that tool for the systematic study of nonideal, nonhomogeneous biological fluids such as blood in microfluidic chips. The technology of probe station allows for automated, high throughput testing and evaluation of microfluidic chips during and after manufacturing. The in-depth fluidics study resulting from the use of probe station provides a better understanding of non-ideal, non-homogeneous fluid flow in common chip components by providing the experimental data needed for perfecting accurate modeling algorithms and providing databases needed for the "device libraries" of computer aided design software. This result would not be possible without the development of the automated microfluidic probe station. Thus, the smart probe station provides for real-time, non-invasive metrology of microfluidic chips.

The smart bio-microfluidic probe station facilitates real-time non-invasive measurements of quantitative, cross sectional information of biological fluidic flow within a biofluidic chip (BioFlip) and system. The station allows preprogrammed actuation of chip and employs the novel techniques of Optical Coherence Tomography (OCT) and Optical Doppler Tomography (ODT) to allow for the non-invasive collection of flow data at any location or depth within a microfluidics chip as described in greater detail in Doe Boer, et al., "Birefringence Imaging In Biological Tissue Using Polarization Sensitive Optical Coherent Tomography," U.S. Pat. No. 6,208,415 (2001) and Chen et.al., "Phase-Resolved Optical Coherence Tomography And Optical Doppler Tomography For Imaging Fluid Flow In Tissue With Fast Scanning Speed And High Velocity Sensitivity, " U.S. Pat. No. 6,549,801, filed May 19, 2000, incorporated herein by reference. The chip need not be transparent.

Using an ODT-based probe station, test devices on microfluidic wafers can be monitored for better process control. During packaging, test fluids can be injected into the chip to ensure proper functioning. Since the probe head in the present invention is a light source, testing can also be performed under extreme conditions (e.g., temperature, pressure, corrosive environments) to ensure that parts meet desired specifications. Furthermore, ODT can probe at different depths, allowing components on all layers of a three dimensional chip to be tested and characterized.

Other techniques such as a fluorescence-based imaging are not likely to be as successful as ODT for this application, although in some applications it may be employed as an equivalent substitute for ODT. Such fluorescence-based techniques are only good for imaging the flow in a plane and not specific for biological fluids such as blood. Furthermore, these techniques are limited by a lack of depth resolution for imaging the flow and the requirement that the chip material be transparent.

The marriage of ODT methods to the characterization of rapidly prototyped microfluidic devices is unique to the invention.

An object of the present invention is to provide a systematic study of non-ideal, non-homogeneous fluid flow in microfluidic chip components. Specifically, the nature of blood flow in microfluidic channels, valves, pumps, mixing chambers, and separation channels is revealed. In an illustrated embodiment polymer-based systems were laminated together to form complex integrated chips. The study is based on our ability to quickly, non-invasively characterize the fluid flow within microchannels using Optical Doppler Tomography (ODT), and our ability to rapidly manufacture many polymer microfluidic chips from a variety of different designs. Accordingly, it is yet another object of the present invention to be able to simulate different bio-microfluidic, non-ideal systems of interest.

Another object of the present invention is to develop some technological tools which are useful to the commercialization and manufacturing of integrated microfluidic systems. The development of these tools arises naturally out of the needs of this study. These include an automated, non-invasive fluidic flow measurement tool based on ODT and a programmable fluidic loader and actuator platform, and a semi-automated rapid prototyping tool.

The present invention is not soley directed to novel component technologies or microfluidic inventions, but includes all existing designs. Nor is there any requirement to optimize any specific component design. Instead, what is provided is some solid engineering groundwork to enable new inventions and designs to be developed for biological fluid systems. The system of the invention allows for the ability to develop engineering practices, standards and "rules of thumb" for phenomena relating to microfluidic design.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The invention can be better visualized by turning now to the following drawings wherein like elements are referenced by like numerals.

BRIEF DESCRIPTION OF THE DRAWINGS

FIGS. 16a and 16b show how a post is created in the silicone mold which sticks out of the polymer during curing. FIGS. 16c–16e show the use of a second mold for the backside which must be designed to match the channel mold. The backside mold can also be used as a part holder during alignment.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE PREFERRED EMBODIMENTS

1. The System

Figure 1:
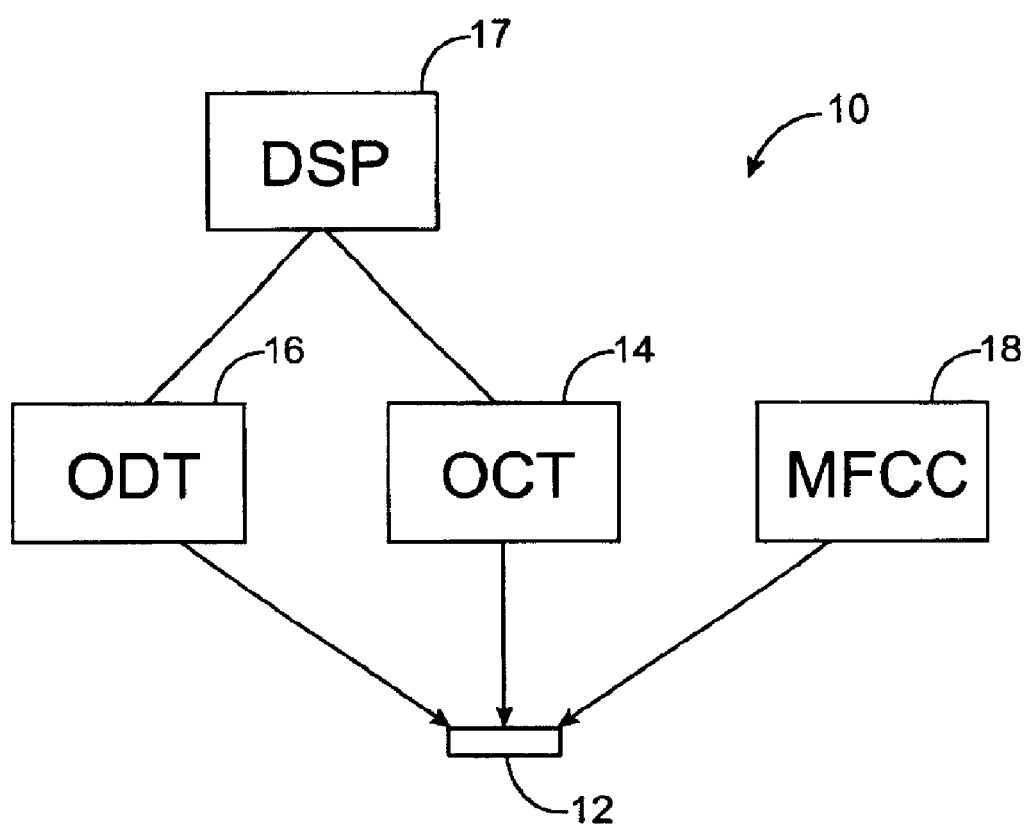
FIG. 1 is a conceptual block diagram of the "smart" microfluidics probe station of the invention.

As shown in FIG. 1 smart microfluidic probe station 10 comprises an Optical Coherence Tomography (OCT) subsystem 14, Optical Doppler Tomography (ODT) subsystem 16, and a microfluidic chip controller (MFCC) 18. MFCC 18 allows fluids to be loaded into the BioFlips 12 at preprogrammed pressures, and provides actuation for certain on-chip components such as valves and pumps. The OCT/ODT subsystems 14, 16 are capable of providing simultaneous multiple point measurements of flow of various fluids in multiple layers of a three-dimensional biological microfluidic chip 12, including biological fluids such as blood, serum, interstitial fluids or saliva.

ODT/OCT based probe station 10 is suitable for microfluidic biochip manufacturing and testing purposes and will enable the development of practical manufacturing technology for biochips 12. Probe station 10 will not only identify design flaws of Bio-Flips 12 in the development phase, but also critically evaluate the manufacturability of the Bio-Flips 12 in production phase for various applications. Automated inspection stations 10 will be an integral part of microfluidic biochip production. Test equipment will allow the assurance of quality control approaching the level enjoyed by the electronics industry today. This will allow for standard methods of characterizations to be developed for the industry. Prototype chips 12 can be easily tested and benchmarked in a common way, allowing for design specifications to be established, similar to the semiconductor chip industry today. We envision that the ODT/OCT based metrology systems will become as ubiquitous in the biochip industry as the scanning electron microscope is in the microchip industry.

The power of station 10 is demonstrated by using it to perform an important large-scale study of the nature of biological fluids near and within common chip components, such as a large scale study of biological fluids in laminated polymer microfluidic chips. Station 10 is used to critically test and characterize polymer-based microfluidic systems or chips 12, through a systematic study of their component technologies under the flow of nonideal, non-homogeneous biological fluids. An automated ODT/OCT-based probe station 10 is used to collect quantitative, cross-sectional information of fluidic flow at various critical locations within the components and the fluidic system. A series of experiments are performed to collect data for different chip configurations, where relevant design parameters are varied. Correlated measurements at different locations are taken, as well as data taken in time sequence.

The result of these studies is a wealth of detailed quantitative information regarding the nature of flow for biological fluids in a variety of common component design configurations. The data is collected and reduced for use in databases, simulations, and for comparisons to theoretical expectations. This study is necessary to enable the design of integrated, complex microfluidic systems 12 which are intended to deliver and process "real world", non-ideal biological fluids such as blood and other bodily fluids.

No similar study of this magnitude has ever been performed, due to the difficulty in obtaining a high volume of quality, quantitative measurements, and the difficulty of obtaining many different chips prototypes for a variety of designs. Systematic studies such as described here need to be performed to enable the development of a mature design practice for complex, integrated microfluidic chips. Without such studies, the working knowledge of microfluidic design will be based on patchy information collected through anecdotal experiences. Such knowledge is only suitable for the simplest of fluidic system design. Certainly, if three dimensional Bio-Flip technology is to develop, mature, accurate computer aided design tools will be needed to assist engineers in understanding the effects of component design in three-dimensional technology on bio-fluidic flow. An understanding of the nature of non-ideal and inhomogeneous biofluids in the Bio-Flips is highly desirable. The effects of non-uniform flow, dead volume between layers, cell adhesion to the surface, etc need to be quantified to develop a robust Bio-Flip design.

This study, which represents a first of its kind for this field, provides the important experimental data which allows sophisticated, accurate modeling algorithms to be developed, particularly for non-ideal fluids. Databases which evolve from our data can be used to develop component "device libraries" in computer aided design software.

Figure 2:
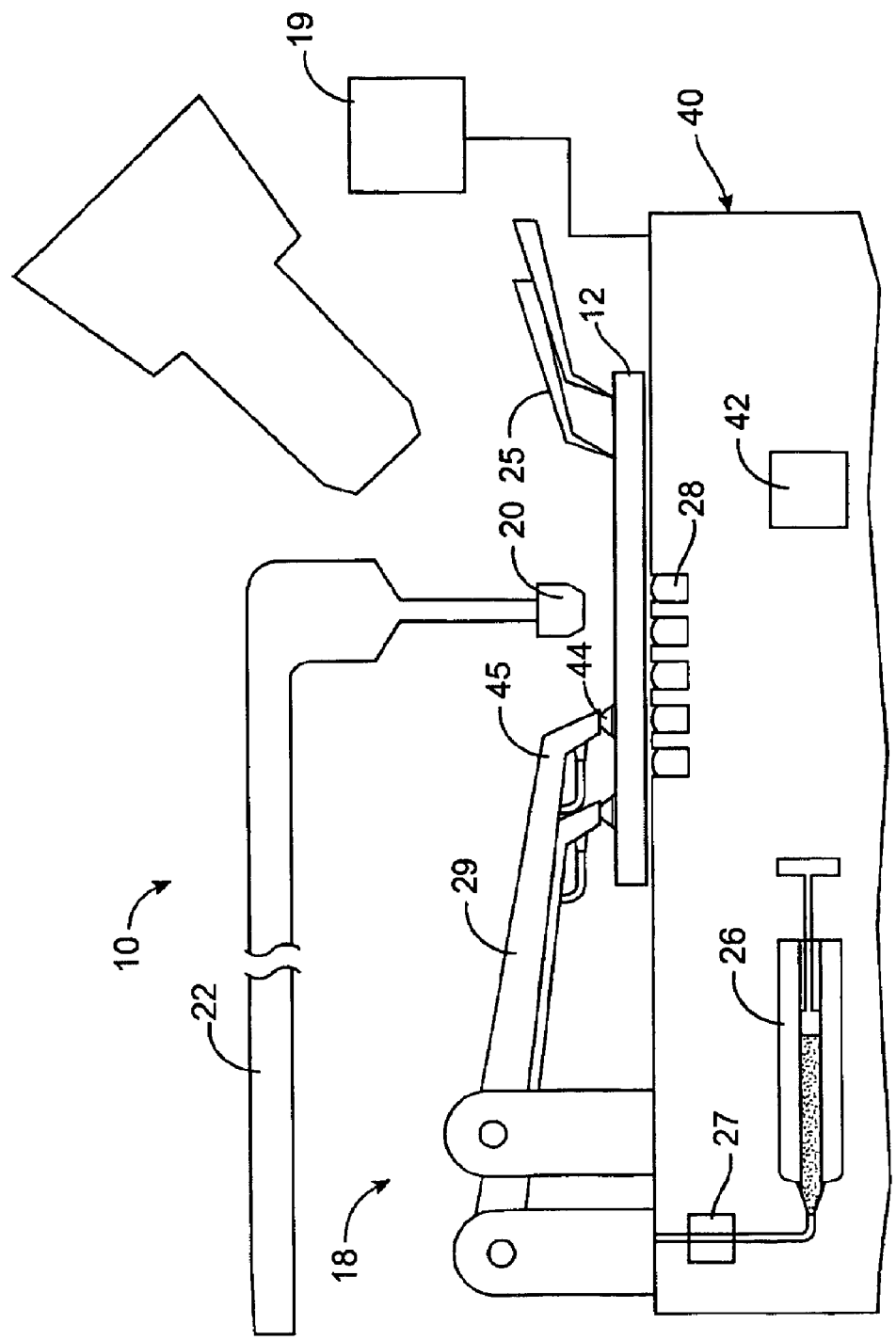
FIG. 2 is a simplified diagram of a "smart" microfluidics probe station of the present invention. The station is the fluidics analog of similar tools found in the integrated circuit industry. The system can actuate or force fluids through the biochip according to preprogrammed instructions, and measure cross-sectional information about fluid flow at many points in the microfluidic chip.
Figure 3:
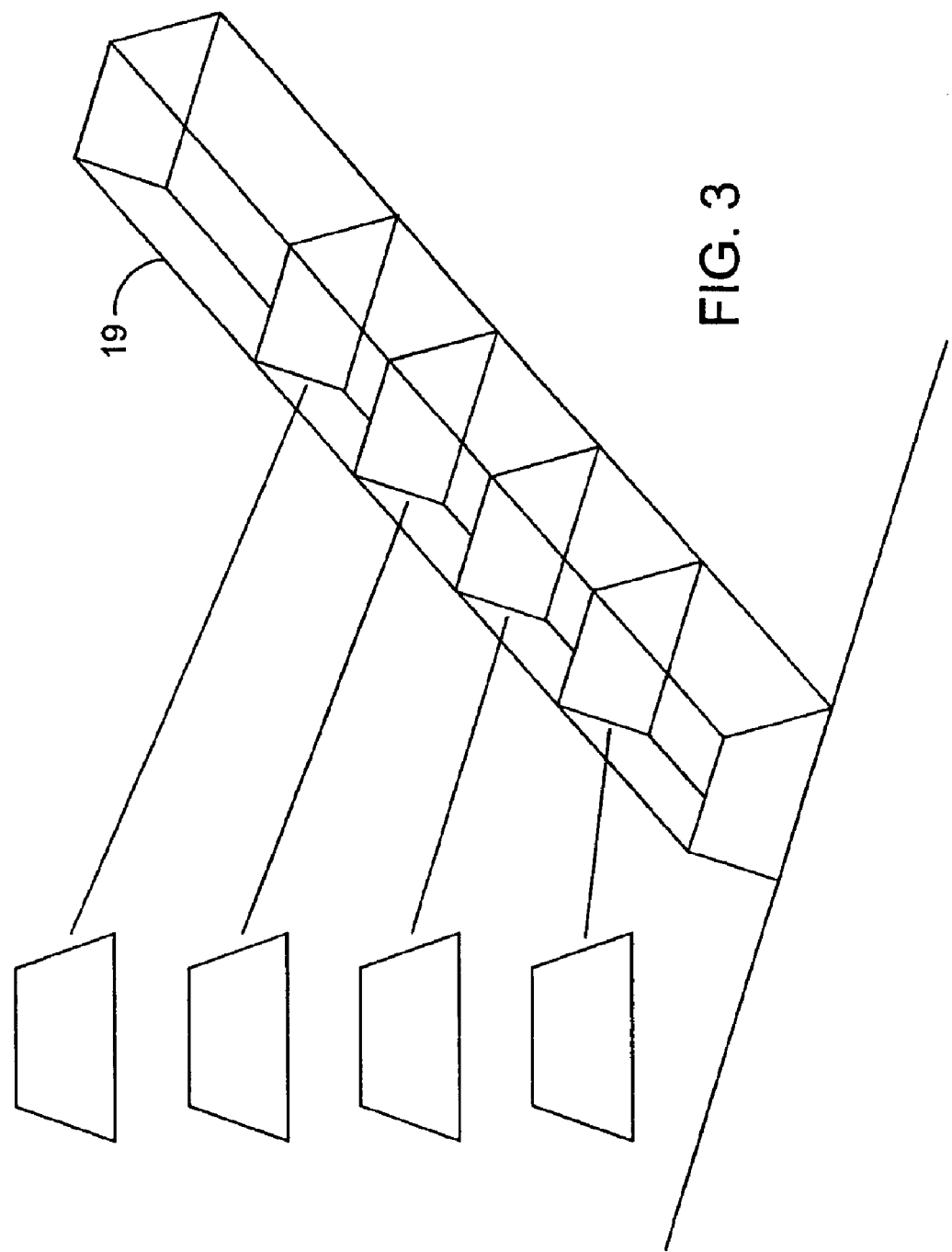
FIG. 3 is a simplified sketch of one visualization of Optical Doppler Tomography (ODT) data. The data contains velocity information for cross-sectional measurements at points along the microchannel. Software correlates the data with specific states of the fluid flow, pressure, and component status.

The study of the invention is possible due to the use of an automated ODT based measurement system. Thus, what is described is an ODT/OCT based smart probe station 10 for real-time, non-invasive metrology of microfluidic chips. Probe station 10 resolves down to approximately 5 $\mu$m pixel size, at 1 mm/sec resolution, at speeds of up to $\frac{1}{20}$ second per cross-section scan. In an exemplary embodiment, the scan head 20 is small (several millimeters) and attached to a robotic delivery arm 22 as shown in FIG. 2, which can manipulate head 20 into any desired location on the chip 12. FIG. 3 is a diagrammatic perspective view of the data produced by the system of FIG. 2 at four sequentially located cross sections in a microchannel 24.

Probe station 10 also contains a microfluidic chip controller (MFCC), generally denoted by reference numeral 18, which will greatly enhance the functionality of the system 10. The MFCC 18 contains probing fluidic connections 29 which quickly connect to probing ports on chip 12. Precision fluid pumps and valves 26 will enable fluid delivery on demand at preprogrammed pressures or flow rates. In addition, MFCC 18 contains electrical probes which measure or deliver electrical signals, or provide high voltage control for electro-osmosis or electrophoresis studies. Furthermore, system 10 contains small "pin" actuators 28, which are used to push diaphragms or other parts of the chip 12 during testing.

System 10 allows automated inspection of microfluidic chips 12 using custom written software. The software allows preprogrammed test sequences to be performed on chips 12 with measurements made at preprogrammed locations and at various depths within chip 12. The software also allows original layout CAD files to be used to map out a test sequence on chip 12. The software also allows some visualization of the flow data in the form of image maps, superimposed on the chip layout drawings. Naturally, data from any run is available for export to other analysis packages.

A large data set of biological fluidic flow properties was measured during a systematic study of component and integrated microfluidic technologies in two and three dimensional biochips 12. This data is reduced for database usage and analyzed for phenomenological representation. The data is highly quantitative and represents a large region of the parameter space expected to be relevant for a wide variety of microfluidic component designs. The knowledge learned from this study is critically important for the development and design of integrated microfluidic systems. The results of this work enable engineering practices, standards and rules-of-thumb to be developed for microfluidic systems.

The data reflects systematic characterization of various components such as pumps, valves, channels, mixers, vias, separators implemented in polymer-based three-dimensional Bio-Flips 12. The data is corrected, analyzed and reduced. In addition, comparisons with ideal fluids and theoretical expectations can be presented. Comparisons to modeling results (simulations) are useful.

The reduced (corrected) data will also be reduced into correlation databases which we refer to as "device libraries". Each component which is studied will have its data represented in this way. The device library acts as a multidimensional transfer function which will allow one to specify the component parameters (size, shape, etc.) and operating conditions (pressure, diaphragm state, etc.) of a device, then look up the flow at regions in or around the device. These can be made available for downloading from public web sites to allow software developers to test their algorithms by direct comparison to our data. Device designers may also use the libraries to aid in their design. Since each library contains all the necessary information regarding the conditions of the run, third-party developers will be able to electronically reproduce a virtual experiment for direct comparison. In this way, the invention enables the delivery of mature, accurate microfluidic modeling and simulation CAD tools.

Consider the general procedure which is used to generate the libraries using station 10 of FIG. 2. After test chips 12 are manufactured and characterized, they are ready for measurement runs. First, the chip 12 is mounted on the chip controller 18 and appropriate fluidic and electrical connections made. Then, an ideal fluid of filtered, deionized water seeded with micro-spheres is loaded into the chip system. Appropriate tests, as specified by a preprogrammed protocol are performed. These consist mostly of actuating certain components (such as valves or pumps) under varying conditions of fluid flow. Velocity measurements will be made by the ODT subsystem 16 at various locations near the components while the test is being performed. All chip controller transducers 45 are monitored during the measurements. After completion of this step, chip 12 is thoroughly washed with a water rinse. After the ideal fluid test and subsequent cleaning, the identical procedure is performed using the biological fluid. The results for both runs are recorded on computer for comparison in later analysis.

Subsequent to these measurements, a calibration run is performed using a standard calibration channel and the ideal fluid. This allows for corrections to be made to account for drifts in the ODT subsystem 16 and chip controller's transducers 45.

Data is collected then corrected using calibration data. Standard data mining techniques are used to search for correlations among the parameters. Where appropriate, these searches are guided by the laws of ideal fluid flow mechanics. In all cases, the ideal fluid results are compared to both theoretical expectations and the biological fluid results. The data analysis includes image maps, three dimensional contour slices, and velocity maps of the fluid flow for interesting cases, where the biological fluid significantly deviated from the ideal fluids. Any general trends which are revealed during the data mining and analysis can be presented as phenomenological laws or formulae.

In addition, database files will be generated which identify the meaning of the data, component designs and specifications used, state of controller transducers, and operating conditions. At one level, these databases can be considered empirical "device libraries" for construction of microfluidic components. A more likely and useful scenario is that model developers can reenact the experiment in their simulations, then use the data to make direct comparisons to their models.

2. The ODT/OCT Subsystem

Heretofore, most measurements in microfluidic devices 12 have been limited to bulk properties of ideal fluid flow, such as friction factors, wall pressure, bulk velocity and specific impulse. Moreover, most measurements have been for simple systems (such as capillaries), or as part of a performance characterization for a specific device. In cases where velocity fields have been measured, the measurements have been limited to ideal fluids in simple channels primarily using particle image tracing techniques. In practice, image streaks are difficult to analyze numerically. Velocity measurements determined from particle streaks are less reliable and are about ten times less accurate than pulsed velocimetry measurements. Furthermore, imaging techniques are usually limited to the measurement of two dimensional flow. Although several papers have been published on fluid velocity metrology, most published results have served to demonstrate a particular method, rather than as an attempt to perform a thorough study of flow characteristics.

Techniques such as Doppler ultrasound (DUS) and laser Doppler flowmetry (LDF) are used for blood flow velocity determination. DUS is based on the principle that the frequency of ultrasonic waves backscattered by moving particles is Doppler shifted. However, the relatively long acoustic wavelengths required for deep tissue penetration limit the spatial resolution of DUS to approximately 200 $\mu$m. Although LDF has been used to measure mean blood perfusion in the peripheral microcirculation, high optical scattering in biological tissue limits spatial resolution.

Figure 6:
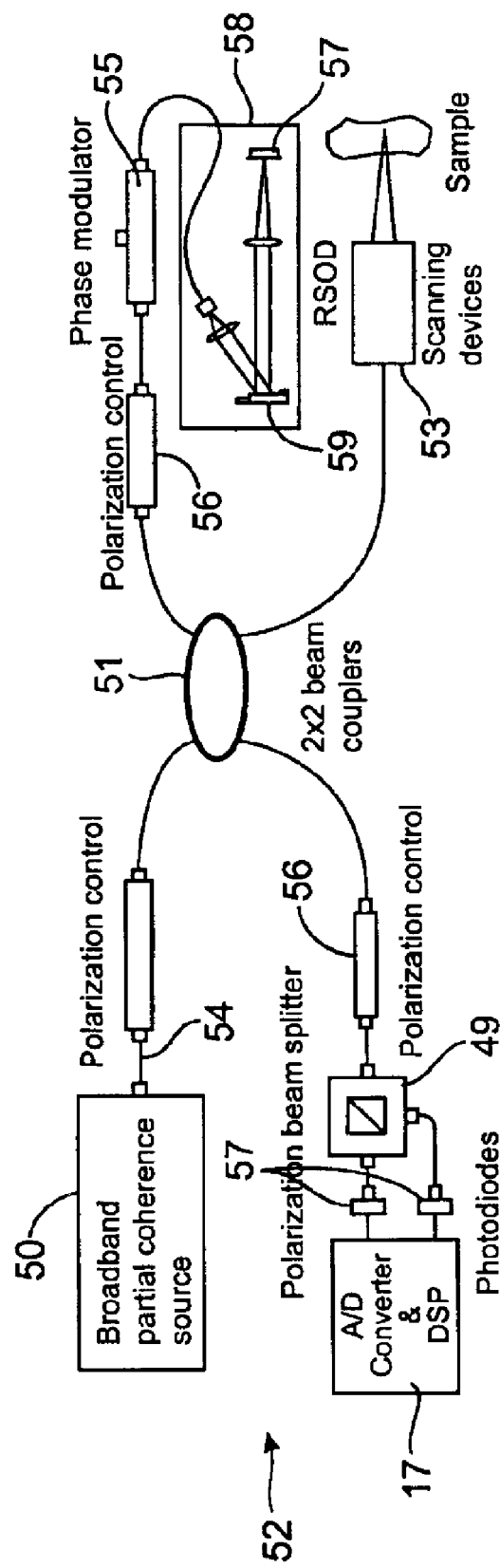
FIG. 6 is a simplified diagram of an improved ODT/OCT scanner according to the invention.

ODT is a noninvasive technique that uses coherent gating of a broad band light source to obtain cross sectional structural and flow velocity images of a microfluidic device with high spatial resolution. The short coherence length of this light source allows micrometer-scale, cross-sectional, structural images of features with lateral and axial resolutions of 2–10 $\mu$m at depths up to 1–2 mm. FIG. 6 shows a prototype fiber based ODT system developed in our laboratory that uses a fiber optic Michelson interferometer with a superluminescent diode (SLD) ($\lambda$=850 nm, $\Delta\lambda_{FWHM}$=25 nm) as the light source 50. The sample and the reference mirrors constitute the two arms of an interferometer. One determines the amplitude of backscattered light from the sample by measuring the interference fringe intensity generated between reference and target beams. High axial spatial resolution is possible because light backscattered from the sample recombines with the reference beam in the 2×2 coupler 51 and interferes only when the optical path length difference is within the coherence length of the source light. Two-dimensional structural and flow velocity images are formed by axial scanning of the reference mirror 57 followed by lateral scanning of the probe head 20. Three-dimensional mapping of microfluidic flow system can also be achieved by stacking of two-dimensional scans. In additional to the structural images, high resolution velocity mapping is achieved by time-frequency analysis of the interference fringe signal.

Our current prototype system is limited by the fact that the image acquisition time is on the order of minutes, which is too long to image flow dynamics. There are two factors that limit the speed in our current OCT/ODT system. First, the scanning of the delay line uses mechanical linear translation, which limits speed. Second, flow velocity images are reconstructed using spectrograms calculated from the power spectrum with short time window fast Fourier transformation (STFT). There is an intrinsic trade-off between spatial and velocity resolutions. When STFT is used to calculate flow velocity, the accuracy is determined by the window size of the Fourier transformation for each pixel.

Inasmuch as detection of the Doppler shift using STFT requires sampling the interference fringe intensity over at least one oscillation cycle, the minimum detectable Doppler frequency shift varies inversely with the STFT window size. With a given STFT window size, velocity resolution ($V_{ODT}$ (min)) is given by $$v_{ODT}(\min) = \frac{\lambda_0}{2\pi\cos(\theta)\Delta t_p}$$

where $\Gamma_{ODT}(v)$ is the time window for the FFT, $\lambda$ is the wavelength of the light, n is the number of cycles and $\theta$ is the angle between the probe head 20 and flow being measured. This dearly shows the inverse relationship between velocity and time window.

Because pixel acquisition time is proportional to the STFT window size, the image frame rate is limited not only by detector sensitivity, but also by velocity resolution. For example, to achieve a velocity resolution of 1 mm/s, the minimum acquisition time for each pixel is approximately 0.9 ms, and a full frame OCT/ODT image with 100×100 pixels requires 9 seconds assuming no overlap in the STFT window.

Figure 5B:
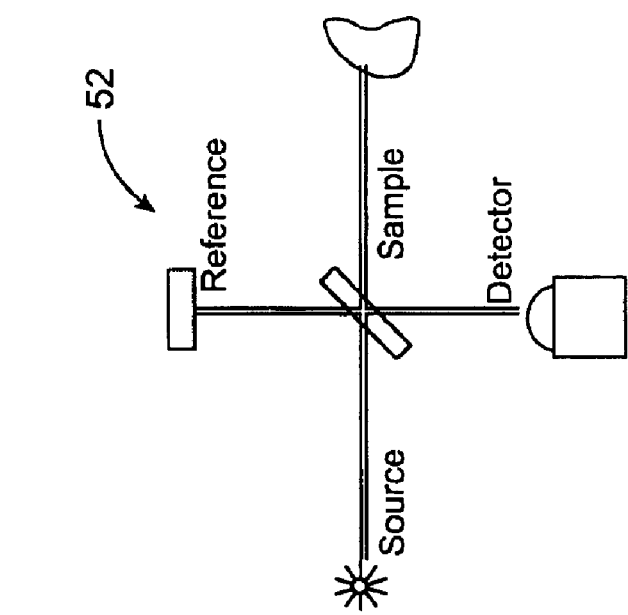
FIG. 5a is a diagram of basic operation behind OCT/ODT as compared to a classic Michaelson interferometer in FIG. 5b. The device of FIG. 5a allows cross sectional profiles of media and velocities to be determined by adjusting the path length of the reference arm.
Figure 5A:
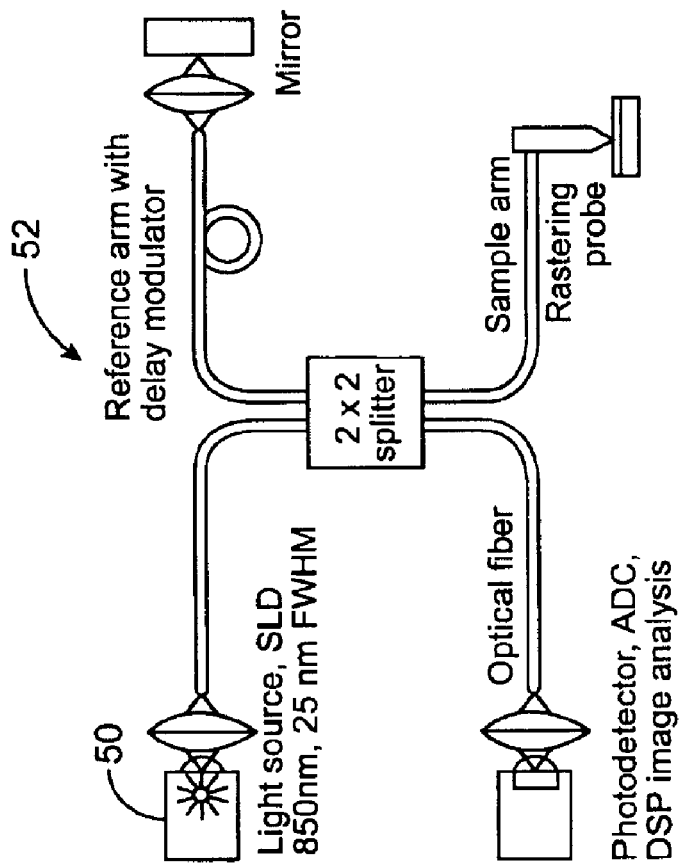

An ODT/OCT measuring subsystem 14, 16 has been previously built and demonstrated and is diagrammed in FIGS. 5a and 5b. FIG. 5a is a simplified schematic of an ODT system and FIG. 5b is a simplified schematic of classic Michaelson interferometer upon which it is based. Unfortunately, the ODT system of FIG. 5a is too slow to perform the kinds of measurements needed here, taking several minutes to perform a cross-sectional scan. We have used the experience gained from working with this first system to build a faster, more accurate ODT system which is suitable for the study shown in FIG. 6.

The general principle of operation between the improved ODT system and the prior ODT system are, however, similar. ODT uses a low coherence light source 50 and a Michaelson interferometer, generally denoted by reference numeral 52, to probe into a sample using two nearly coherent light beams. By adjusting the relative path length of the two nearly coherent beams of light, one can effectively probe into a sample since interference will only occur at a localized depth. By analyzing the power spectrum while scanning a reference beam, one can determine where the two light beams are interfering. The magnitude of the interference is related to the amount of light scattered at a specific depth, and the attenuation of light at that depth. Thus, scatterers (such as channel walls and blood cells) can be mapped. By physically moving the light beams in a raster, one can map out a cross sectional image of the channel.

Moving scatterers modify the interference due to Doppler shifting of the reflected light. The nature of the modification is well known, and velocity information can be determined by suitable analysis of the power spectrum. Since the modification to the interference pattern is different for forward moving particles than for backward moving particles, the direction of the velocities can also be determined. Unfortunately, since both the position information and the velocity information are determined by analyzing the same power spectrum, there is an inherent tradeoff between position resolution and velocity resolution. Also, the delay in the reference beam is performed by moving a mirror back and forth, making this process slow.

To improve speed and resolution, phase information is employed instead of intensity information to determine the velocity. In the new ODT, a special delay line will be used which can induce a delay in the reference beam which is a function of wavelength (the current system performs a global delay, independent of wavelength). The same rastering method is used to collect information from a cross section of the channel. However, in the new method, the velocity information and position information are determined by different analyses, so high resolution information can be achieved for both cases. Since the delay line system involves only the slight rotation of a mirror, the delay mechanism is fast and scanning can be correspondingly quick. A diagram of the new system is illustrated in FIG. 6.

The invention is further characterized by its ability to quickly and automatically collect velocity data at various locations within a microfluidic chip 12, and under various operating conditions. Optical Doppler Tomography (ODT) provides the means to collect velocity data as a function of cross sectional position. The-ODT subsystem 16 uses a low coherence light source with a Michaelson interferometer to scan a cross section of a fluidic channel in biochip 12, revealing velocity information at all points within the cross section. The technique is non-invasive and requires only that infrared light be able to penetrate into the chip material to be scattered from the fluid. The velocity information which is returned is quantitative and accurate to within a few mm/sec.

The ODT subsystem 16 is an upgraded version with higher speed, resolution, penetration depth and signal quality. The speed and resolution upgrades are required in order to see time dependent effects correlated with actuation of the chip components. As stated above there are two factors which limit the speed in the prior OCT/ODT subsystem as described in De Boer, et al., "Birefringence Imaging In Biological Tissue Using Polarization Sensitive Optical Coherent Tomography," U.S. Pat. No. 6,208,415 (2001). First, the scanning of the delay line uses a mechanical linear translation, which limits the speed. Second, flow velocity images are reconstructed using spectrograms calculated from the power spectrum with short time window fast Fourier transformations (STFT). There is an intrinsic conflict between spatial and velocity resolutions.

To overcome this limitation, the ODT subsystem 16 of the invention uses phase information for velocity image reconstruction as described in Chen et.al., "Phase-Resolved Optical Coherence Tomography And Optical Doppler Tomography For Imaging Fluid Flow In Tissue With Fast Scanning Speed And High Velocity Sensitivity" U.S. Pat. No. 6,549,801, filed May 19, 2000. Phase resolved OCT/ODT has the advantage that velocity image resolution is not limited by the STFT window size of individual pixels.

To overcome the limitation of current ODT technology, we have developed an ODT system that uses phase information for velocity image reconstruction. Phase resolved OCT/ODT has the advantage that the velocity image resolution is not limited by the STFT window size of individual pixels. As previously stated, the schematic diagram of the phase resolved OCT/ODT system is illustrated in FIG. 6. A broadband partial coherence source 50 is coupled into a single mode fiber 54. Polarization control devices 56 are inserted into the fibers 54 to control the polarization states of the light. A rapid-scanning optical delay (RSOD) line 58 is used for group phase delay or depth scanning. RSOD 58 is based on the principle that a linear phase ramp in the frequency domain produces a delay in the time domain. A grating 59 in the delay line 58 is used to spread the spectrum of the source 50 across a galvanometer-mounted mirror 57. Tilting the mirror 57 introduces an optical path delay that varies linearly with wavelength. Scanning speeds of a few kHz with a depth range of several mm have been achieved with the RSOD 58. Because RSOD 58 can uncouple the group delay from the phase delay, an electro-optical phase modulator 55 is introduced to produce a stable carrier frequency to improve the accuracy of the velocity measurements.

Compared to previous OCT/ODT designs where mechanical or piezo scanning was used, electro-optical phase modulation produces a more stable carrier frequency, which is important because the precision of the velocity image depends on carrier frequency stability. Light reflected from the sample is recombined with that from the reference beam in the 2×2 beam coupler 51 to form interference fringes. A polarization beam splitter 49 is used in the detection arm to split the signal into two perpendicular polarization states, which are then detected by photodiodes and digitized with A/D converters 17. The detected signals from the two polarization channels are combined to form a polarization independent interference signal, which removes artifacts due to fiber bending or birefringence in the biological tissue under study. The design phase resolved ODT has the following performance parameters.

Spatial resolution is 2–7 µm, depending on coherent length of the source 50. Current commercial sources have a coherence length of 7 µm, however, a number of companies and research groups, are developing broad band source with coherent length on the order of 2 µm. Velocity sensitivity is 10 µm/s with axial-line scanning speed at 1 kHz.

The design uses both phase and amplitude information for structural and flow velocity reconstruction, which requires determination of the complex valued analytic signal of the interference fringe intensity. Analytical continuation of a real function can be obtained through a Hilbert transformation by $$\tilde{\Gamma}_{ODT}(\tau) = \Gamma_{ODT}(\tau) + \frac{i}{\pi} P \int_{-\infty}^{\infty} \frac{\Gamma_{ODT}(\tau')}{\tau' - \tau} d\tau$$

where P denotes the Cauchy principal value taken at $\tau'=\tau$. If $\Gamma_{ODT}(\tau)$ is square-integrable, then can also be calculated as $$\tilde{\Gamma}_{ODT}(\tau) = \int_0^{\infty} \hat{\Gamma}_{ODT}(\nu) e^{-2\pi i \nu \tau} d\nu$$

where $\hat{\Gamma}_{ODT}(\nu)$ is the Fourier transform of the signal $\Gamma_{ODT}(\nu)$, $$\hat{\Gamma}_{ODT}(\tau)\hat{\Gamma}_{ODT}(\nu) = \int_{-\infty}^{\infty} \Gamma_{ODT}(\tau) e^{2\pi i \nu \tau} d\tau$$

Once $\hat{\Gamma}_{ODT}(\nu)$ is determined, the phase change in each pixel between sequential A-line scans is then used to calculate the Doppler frequency shift $$\omega = \frac{\Delta\phi}{T}$$

where T is the time interval between each A-scan. Because T is much longer than the pixel time window, very small Doppler shifts can be detected using this technique.

There are two methods for signal processing and image reconstruction. The first is the analogue technique that uses a lock-in amplifier for coherent demodulation of the interference fringe signal. The in phase signal i(τ) and quadrature signal q(τ) from the coherent demodulation is used to calculate the amplitude and phase of the $\Gamma_{ODT}(\tau)$. The amplitude is then used for structural image reconstruction, and the derivative of the phase is used for velocity image reconstruction. This method has the advantage of easy implementation and fewer computational power requirements for image reconstruction. However, the analogue method does not have the flexibility of a digital signal processing DSP system, where arbitrary and multiple filters can be implemented simultaneously. Furthermore, the dynamic range of a lock-in amplifier at high frequencies is limited.

Figure 13:
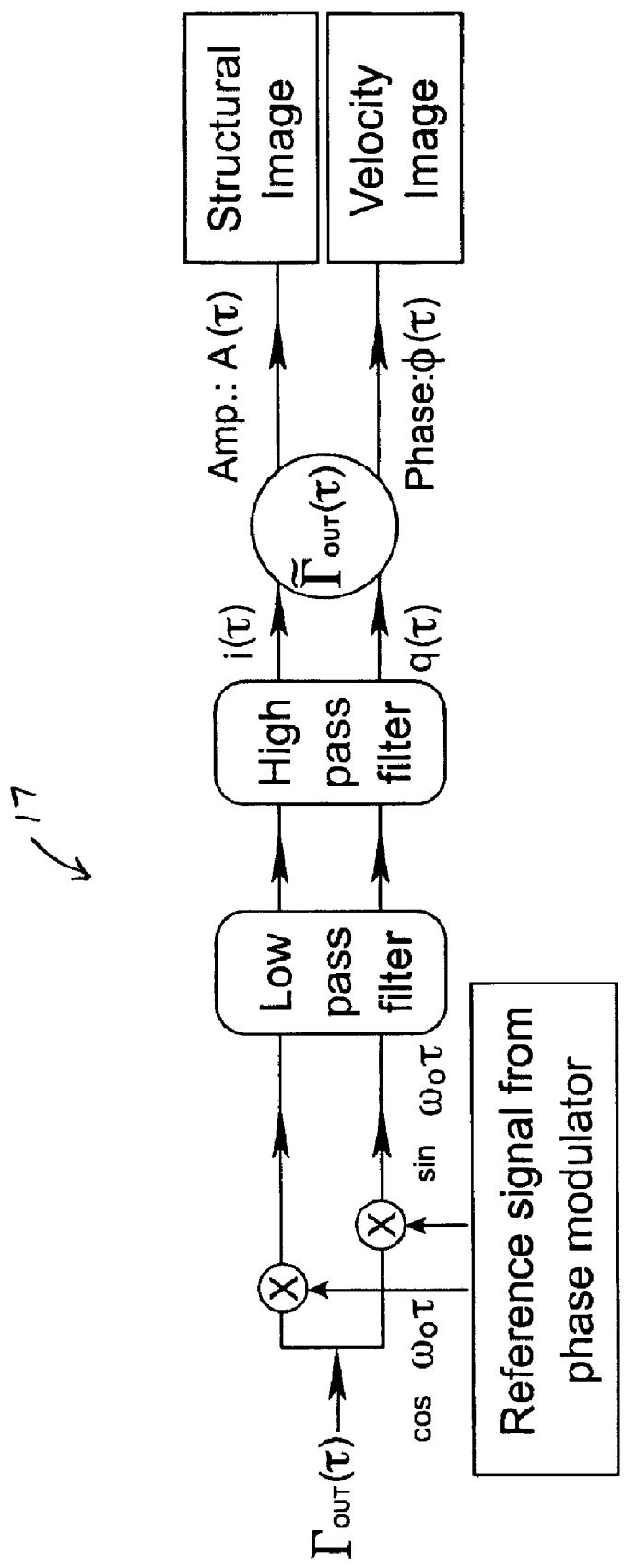
FIG. 13 is simplified flow diagram for the OCT/ODT image reconstruction using a DSP board.

Alternatively, a digital signal processing (DSP) module 17 for high resolution image reconstruction can be used as illustrated in FIG. 13. In this method, the time domain fringe signal is first Fourier transformed, and then passed though a band pass filter to reduce noise. The signal is then truncated to extract only positive phase shifts. The ODT signal can then be can then be obtained with a second FFT.

The amplitude and phase of the resulting signal will be used to reconstruct structural and velocity images. Since the FFT window size is taken to be the whole line scan instead of a single pixel, velocity resolution will not be limited by the single pixel window size as it currently is in the power spectrum method.

A DSP module (32 Bit PO local bus circuit board and 8 Texas Instruments DSP chips with 12.8 giga instructions per second) will be used for signal processing and image reconstruction. Assuming a 10 Kbit AID data for each scan, this DSP module can perform a FFT within 100 µsec. The estimated processing time for each scan is less than 500 µsec. Thus, a 100×100 pixel image can be acquired at a speed of more than 20 frames per second. Increasing the number of parallel DSP boards (or replacing with newer, faster DSPs when they become available) can further increase the frame rate.

There are few experimental velocimetry techniques which compare well with ODT for the purposes of this proposal. Almost all ODT work has been directed at the in situ monitoring of blood flow in animals. In addition to the collaborations of various groups have reported successful work using ODT (also called CDOCT, color Doppler optical coherence) tomography. These researchers report spatial resolution on the order of 20 µm, with velocity resolution on the order of 500 µm/s. Unfortunately, microfluidic chip systems often have features significantly smaller than 20 µm, thus requiring a technique with greater imaging resolution. Furthermore, imaging times for conventional ODT (or CDOCT) ranges in the minutes, which is too slow to measure dynamic effects. There are no reports of ODT used for characterization of flow in microfluidic systems, except for those from members of our collaboration.

3. The Test Stage and Pump Assembly

Probe station 10 is comprised of three elements: (1) an ODT/OCT optical system 14, 16 which uses phase modulation for velocity measurements, (2) a DSP module 17 for high resolution image reconstruction, and (3) a microfluidic chip controller platform (MFCC) 18.

The microfluidic chip controller 18 will be built using standard engineering practices and is shown in FIG. 2. This controller 18 interfaces with a PC 19 using standard I/O protocols and control components. Miniature valves 27 control the delivery of fluids under pressurized conditions. For fluidic chip actuation, MFCC 18 contains a small solenoid or pneumatically actuated pins 28 which lie in the bed of the chip holder platform 40. These pins 28 may be actuated by computer 19 to push into chip 12, causing actuation of a component on the chip 12. Sensors monitor the fluid pressure and pin force for readout by computer 19.

Stage platform 40 contains a chip "controller", a chip holder that contains fluidics loaders, and small actuators for actuating diaphragm valves and pumps, or other components. The stage platform 40 allows testing component designs without the need for building the actuating circuitry on the devices. Collectively, we refer to the ODT system, the computer controlled stage 40, and the chip controller as the "microfluidic probe station".

Also included is a motorized, programmable test stage and pump assembly 40 combined with OCT/ODT subsystem 16 shown in FIG. 2. This stage and pump assembly 40 will hold microfluidic test chip 12, and provide the necessary device actuation or fluidic pumping needed to perform the study. The stage and pump assembly 40 are moved under the control of computer 19 to make multiple measurements on a single chip 12 during experiments. One or more high precision syringe injection loaders or pressurized fluid sources 26 with computer controlled actuation are used to load the chip 12, if required. The pressurized fluid sources also mate with one to six external fluidic probes 29 which are placed and mounted at locations on the fluidic chip 12. The external fluidic probes 29 contain micropressure transducers 45 at their tips to monitor fluid pressure at the loading port. This will greatly increase the throughput for completing measurements, and also improve the quality and repeatability of the measurements. In addition, MFCC 18 contains at least one computer controlled vacuum line which can also mate with one of the external fluidic probes 29.

MFCC 18 contains one to four computer controlled power supplies (not shown) with corresponding external electrical probes 25 to allow for CE tests to be performed on chip 12. The power supplies will be capable of delivering 10 mA at 1000 V.

To experimentally measure the flow profiles under a variety of operating conditions test chips were mounted on a custom built motorized stage 40. Stage 40 contains fluid reservoirs 42 for loading the fluid into chip 12, and pressurized nozzles 44 for forcing the fluid through the microchannels on chip 12. In addition, stage 40 contains small mechanical actuators 28 (alternatively pins or pneumatic actuators) to deflect membranes in diaphragm-based pumps and valves in chip 12.

For each of the components listed above, appropriate operating conditions are varied. For example, within the channels, delivery pressure will be modified. For pumps, actuation frequency and amplitude will be modified. All relevant variables (fluid delivery pressure, deflection time, electrode voltage, etc.) are recorded during the experiments.

The ODT/OCT probe head 20 is moved into a preprogrammed position over the channel and the appropriate flow conditions initiated. Flow measurements are correlated to a cross section for test chip 12 and are recorded according to the invention, then the probe head 20 is moved to the next preprogrammed location. In the case of actuated elements, the state of actuation (such as the flexure state of a membrane) is recorded simultaneously. This allows us to seek correlations between actuation and flow. Many measurements at various predetermined locations on the chips are taken for each test chip 12. The runs are performed two times. The first time with a calibration fluid (water seeded with microspheres), the second time for blood, for example. After each run, a calibration run is made using a prefabricated calibration chip to track drifts in the ODT/OCT data.

4. Rapid Prototyping Process

The invention employs a rapid prototyping technique for developing complex, laminated microfluidic chips from a variety of polymers. Using this technique, researchers can build a custom laminated fluidic device within one to three days. This ability to generate many chips, from many different materials will enable the systematic study of component and integration technologies.

The ability to perform many experiments on many test designs, where critical design parameters are varied, depends on the ability to quickly and cheaply generate microfluidic test chips. The illustrated embodiment is a rapid prototyping process for polymer microfluidic chips 12. This rapid prototyping process involves the creation of a micromachined master mold, from which a secondary negative mold is generated in silicone rubber (polydimethylsiloxane-PDMS). Final parts are molded from the PDMS mold which are identical replicas of the micromachined master. Through careful alignment of parts and molds, researchers can fabricate complex laminated systems from a wide variety of plastics.

While the rapid prototyping method is fast, the current construction process is by hand and is labor intensive. Such a method may be useful for a quick turnaround of a few test chips, but cannot sustain the large number of custom chips. Furthermore, the human element in fabrication results in variations from batch to batch which may compromise the quality of the final measurements. Therefore, much of the rapid prototyping process is automated to avoid this disadvantage. Reffering to FIG. 4 a sketch of a proposed semi-automatic molding tool for rapid prototyping of polymer fluidic chips is shown. Specialized assembly 34, which precisely moves the molds, injects liquid polymers, controls temperature, pulls vacuum, and flushes with ambient gases is provided with all functions under the control of an external computer 43. This semi-automated system is also fitted with an inspection microscope 38 so that a technician may align parts and molds before initiating a molding or sealing sequence as shown in assembly 34 depicted in FIG. 4.

Master molds 80 made of silicon, glass and SU-8 can be used for casting, however, the number of polymers which can be removed from these molds is limited. Mold release agents can be used to help release, but certain polymers, polyurethanes and some epoxies in particular, are particularly difficult to release. Furthermore, if the device material is not durable or very thin, the act of removing it from an inflexible mold will distort or damage the part.

To facilitate fabrication with a wider variety of polymers, we exploit the excellent casting properties of PDMS (silicone) to form a mold from a micromachined master. Silicone is extremely inert so that very few materials stick to it, and flexible, making it ideal for releasing a large variety of different materials. Furthermore, silicone is durable, resistant to chemicals and heat, and easy to process at room temperature. Thus, silicone makes a good candidate for a micromold material.

Using silicone molds, we can successfully cast microstructures from variety of materials, including polyurethanes, polyester, epoxies, latex rubber, Teflon, and acrylic. In addition to reaction cure polymers, thermoplastics can be cast if they are dissolved in a suitable solvent. In this case, the liquid is cast and the solvent slowly evaporated away to form a solid in the mold. Example polymers which can be "solvent cast" are Teflon and acrylic. The technique is not limited to polymers, and may be applied to low melting point metals and ceramics (in binder). We have also used silicone as molds for hot rolling and hot embossing.

Figure 15A:
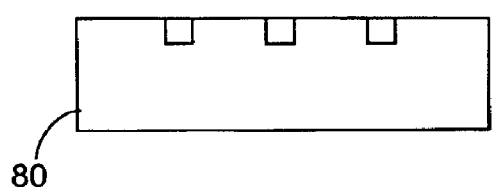
FIGS. 15a–d are flow diagrams showing basic process of cast molding using "double casting".
Figure 15C:
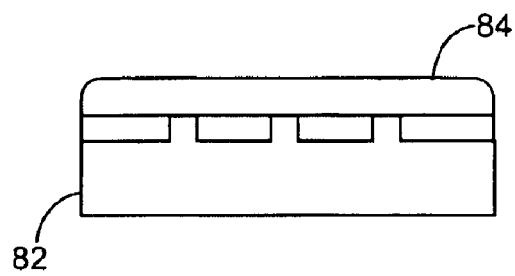
Figure 15B:
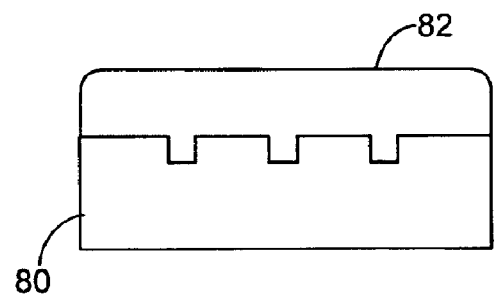
Figure 15D:

The rapid prototyping technique is based on a process of "double molding", sometimes referred to as "replica molding". FIGS. 15a–15d are diagrams showing basic process of cast molding using "double casting". First, a master 80 is created using standard micromachining techniques as shown in FIG. 15a. Silicone rubber (PDMS) is cured against the master 80, creating a negative mold 82 as shown in FIG. 15b. A wide variety of polymers can be cast against the inert, flexible silicone mold 82 as shown in FIG. 15c. The mold 82 is peeled away yielding a replica polymer microfluidic system 84 as shown in FIG. 15d. In this process, molds 80 are created from silicon or other micromachinable materials, then a second (negative) mold 82 is created from the first. This second mold 82 is made from an inert material, such as silicone rubber (polydimethylsiloxane—PDMS). The inert nature and flexibility of the PDMS allows a variety of other polymers and other materials to be cast into the silicone mold, generating replicas of the original part in a variety of materials. The PDMS-based replica molding process exhibits very high pattern transfer resolution. Our experience is that sub-micron features are easily transferred to the final part, and surface roughness closely follows the original part. We have observed this to be true for a variety of materials.

In addition to molding the individual layers of microfluidic systems, we identify the procedure for laminating and sealing the microfluidic chips. Many of the component designs rely on a laminated system for their operation, and sealing is a necessity for all microfluidic devices. There are several issues relevant to laminating micropatterned polymer layers. The main issues of concern are vias between layers, registration, and sealing. For most systems, each layer is typically 150–300 microns thick. Many materials are not rigid at this thickness, and this must be taken into account when designing methods for working with the layers during lamination.

Via holes which provide access for fluid flow between layers are necessary to achieve true three dimensional fluidic systems. There are several ways to fabricate the vias in polymer systems. The simplest method, however somewhat problematic, is to punch small diameter holes through the plastic at the desired locations using a small, sharpened steel tube. Using a jig with a microscope, the holes (which are larger than the channels) can be aligned to within about 15 microns before punching. Drilling, heating, and cutting generally yield poor results, especially in the thermoplastics.

Figure 16A:
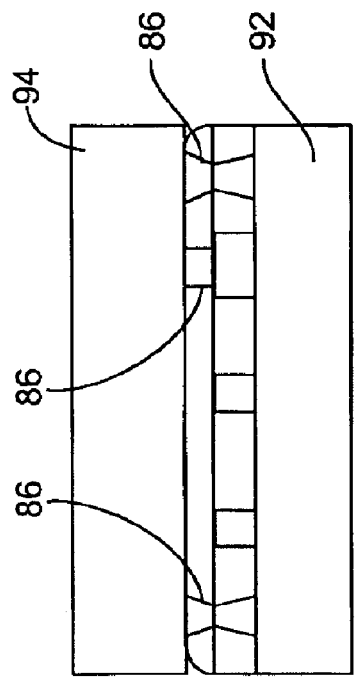
FIGS. 16a–16e are flow diagrams showing two methods for creating vias (and access ports).
Figure 16B:
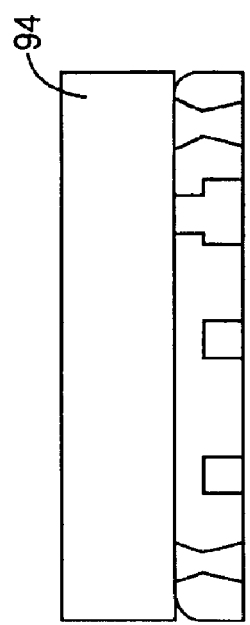

Our preferred method is to mold the vias into the material. We have examined two methods, both diagrammed in FIGS. 16a–16d. The first method is the simplest, and involves the creation of a post 86 in the silicone mold 88 as shown in FIG. 16a. When the polymer is cast molded, the post 86 sticks out, leaving a hole 90 after the mold 88 is removed as shown in FIG. 16b.

Figure 16C:
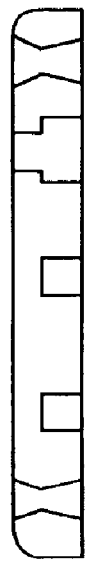
Figure 16D:
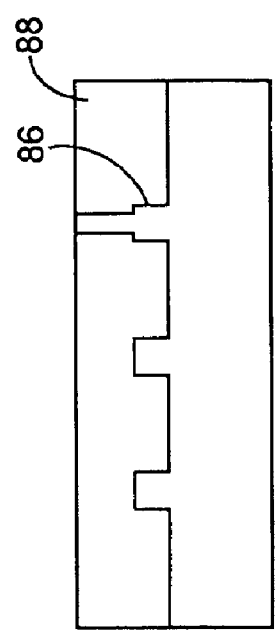
Figure 16E:
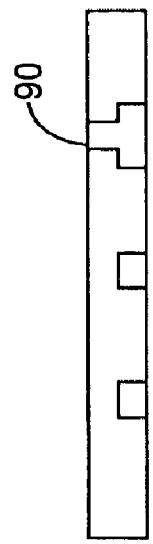

A second method uses two molds, front-side mold 92 and back-side mold 94 as shown in FIG. 16c. While this requires more effort, it is preferred for several reasons. The backside mold 94 ensures that the microfluidic backside will be flat (or roughened, or patterned, if desired). Additionally, the spaces between the mold posts 86 ensure a constant thickness for the part. After removing the front-side mold 92, the backside mold 94 acts as a part holder for subsequent sealing and alignment work as shown in FIG. 16d. Removal of backside mold 94 then leaves the finished microfluidic part as shown in FIG. 16e. The use of a front-side mold 92 and back-side mold 94 increases time associated with building a part to (typically) more than a week.

Again the fabrication process is hindered by the fact that most of the work is currently done by hand, making this a labor intensive process. This also reduces the quality and repeatability of the fabricated devices, since human error and fatigue can affect the quality of the molded part.

Since the principle objective of the study is to quantify flows of non-ideal biological fluids (blood) in and around microfluidic chip functional components under various operating conditions and design parameters, several common components of an integrated microfluidic chip must be designed, and then these designs varied to understand how the flow is correspondingly modified. All variants of the designs are fabricated and subjected to the flow tests so that general trends and correlations to the design parameters are revealed. Manufactured chips 12 are characterized using characterization tools to determine geometries, surface roughness, and surface chemistry.

There are many functional units within an integrated microfluidic chip 12. These include loading ports, channels, valves, pumps, reaction chambers, separators, analysis devices, and sensors. Each of these components are studied individually, and then within an integrated system. In all cases, actuation, if required, is performed externally. The following microchip components are characterized using station 10.

Figure 7:
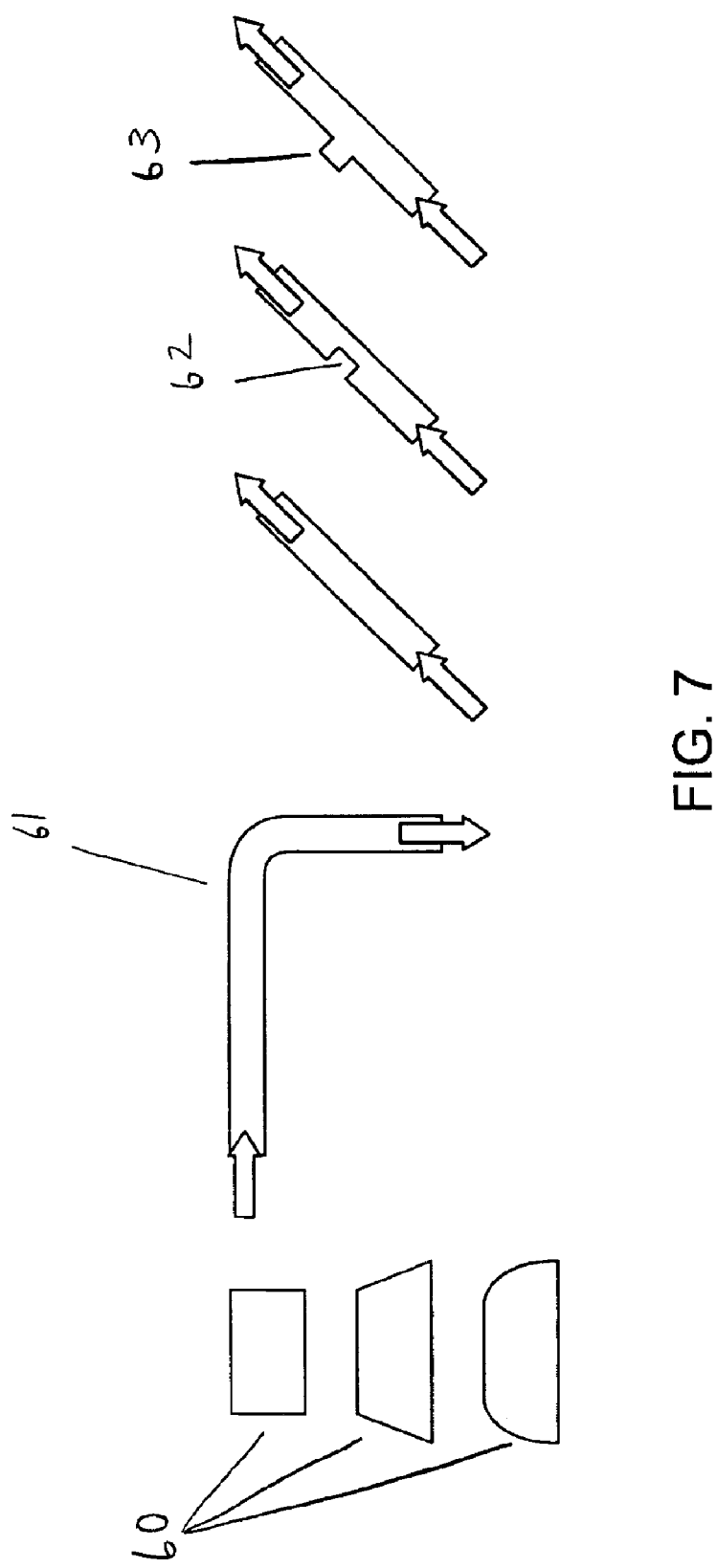
FIG. 7 is a simplified side cross-sectional view of some microchannels showing cross sections, bend radii, taper section, protrusions, and dead space.

Channels as shown in FIG. 7 were constructed with varying (1) cross sectional dimensions (not shown), g(2) cross-sectional geometries 60, (3) bend radii 61, (4) taper geometry, (5) orifices 62, (6) protrusions 63, (7) voids (dead space), (8) wall roughness.

Figure 8:
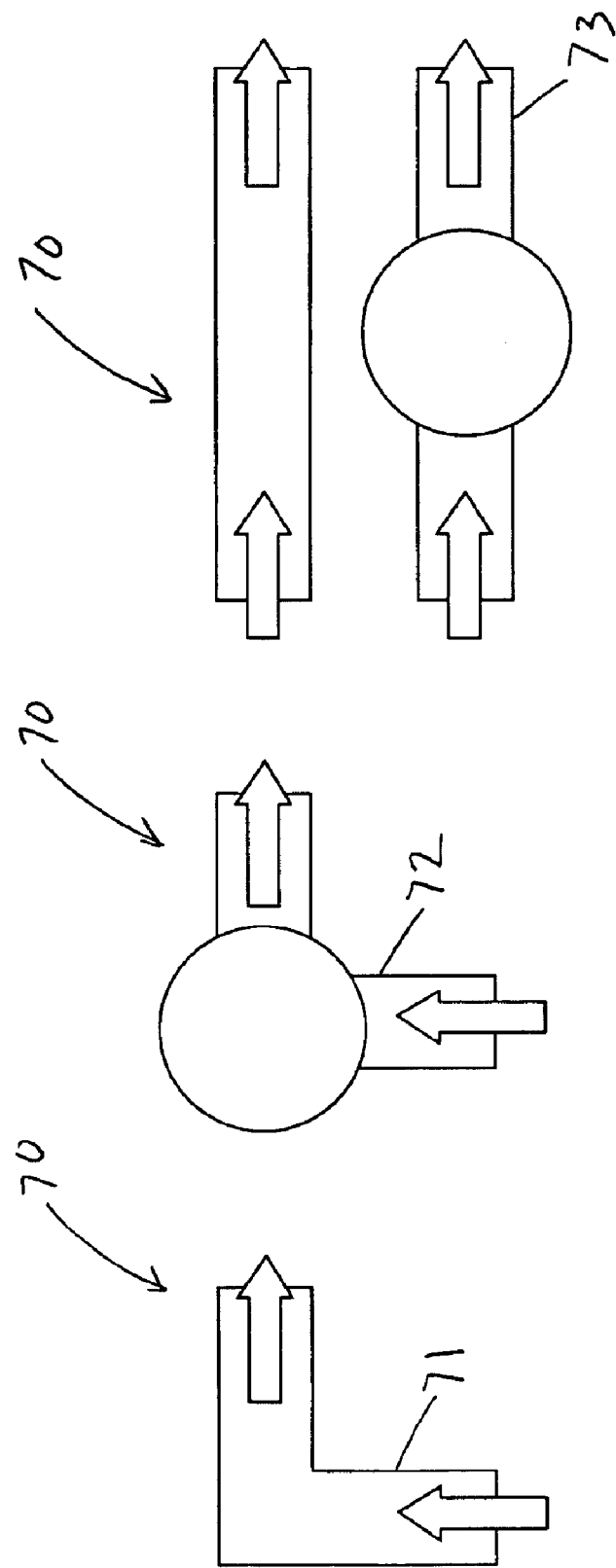
FIG. 8 is a simplified side cross-sectional view of some examples of vias of different sizes and orientations.

In addition, flow through vertical vias were studied. Vias 70 as shown in FIG. 8 were manufactured in laminated chips which allow fluid to flow from one layer to the next. The vias 70 were generated with varying sizes with respect to the channels, and in varying configurations 71, 72, 73.

Figure 9:
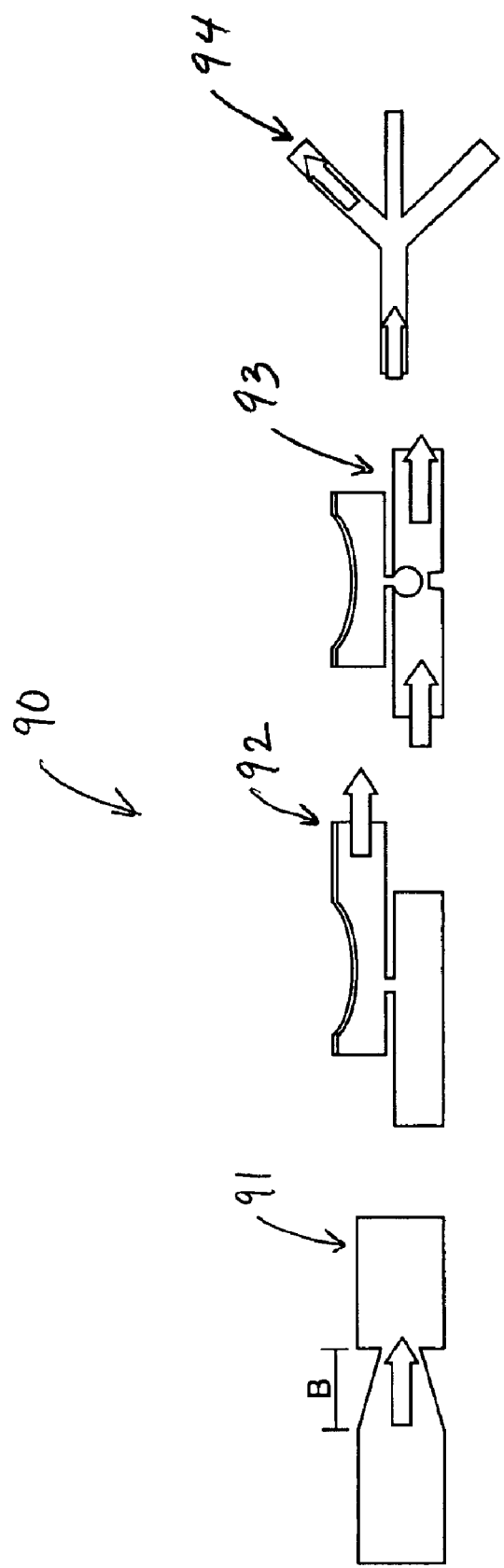
FIG. 9 is a simplified side cross-sectional view of exemplary microvalves, e.g. a diffusion valve, diaphragm valve, bubble valve, and Laminar valve.
Figure 10:
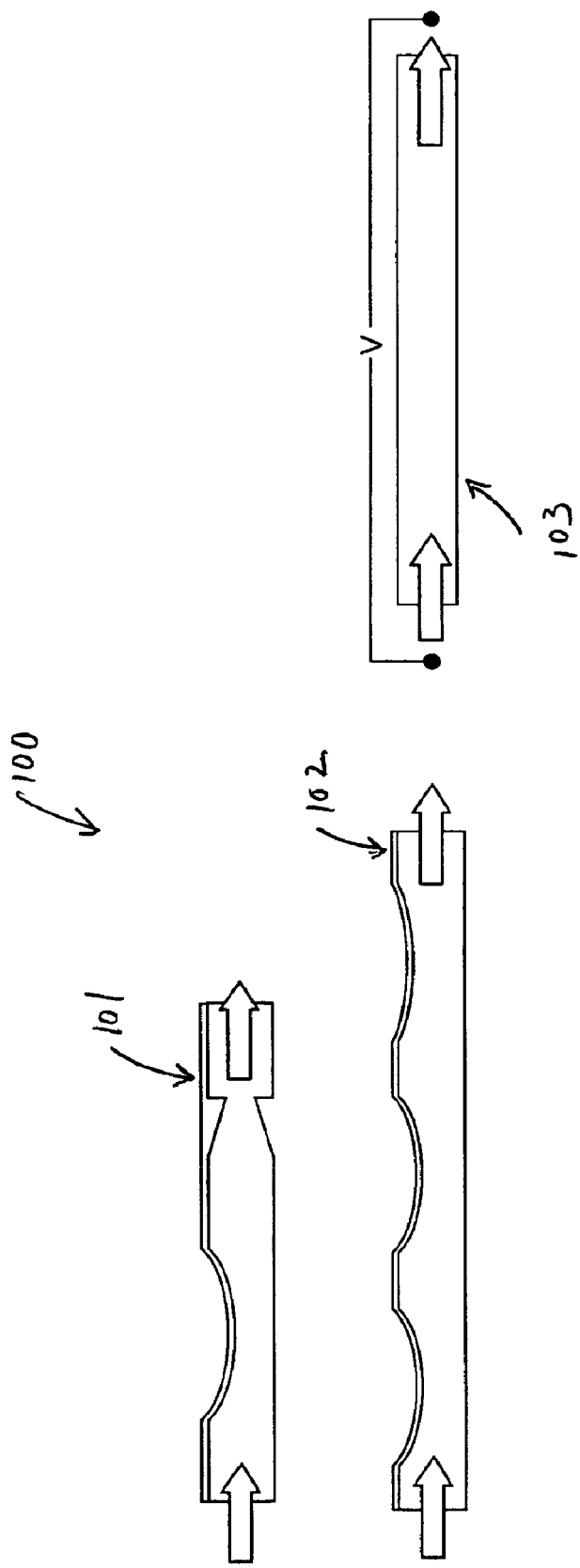
FIG. 10 is a simplified side cross-sectional view of exemplary micropump designs, e.g. diaphragm pump, peristaltic pump, electro-osmotic pump.

Four types of common microvalves 90 were constructed as shown in FIG. 9. These included (1) diffusion valves 91, (2) diaphragm valves 92, (3) bubble valves (liquid and gas) 93, and (4) laminar flow valves 94. Critical design parameters of each (diaphragm size, taper, orifice size, etc.) were varied for each type of valve Three types of common pumps 100 were constructed as shown in FIG. 10. These included (1) diaphragm pumps with check valves 101, (2) peristaltic pumps 102, (3) electro-osmotic pumps 103. Critical design parameters of each device (diaphragm size, chamber size/shape, orifice sizes, etc.) were varied for each type of pump.

Figure 11:
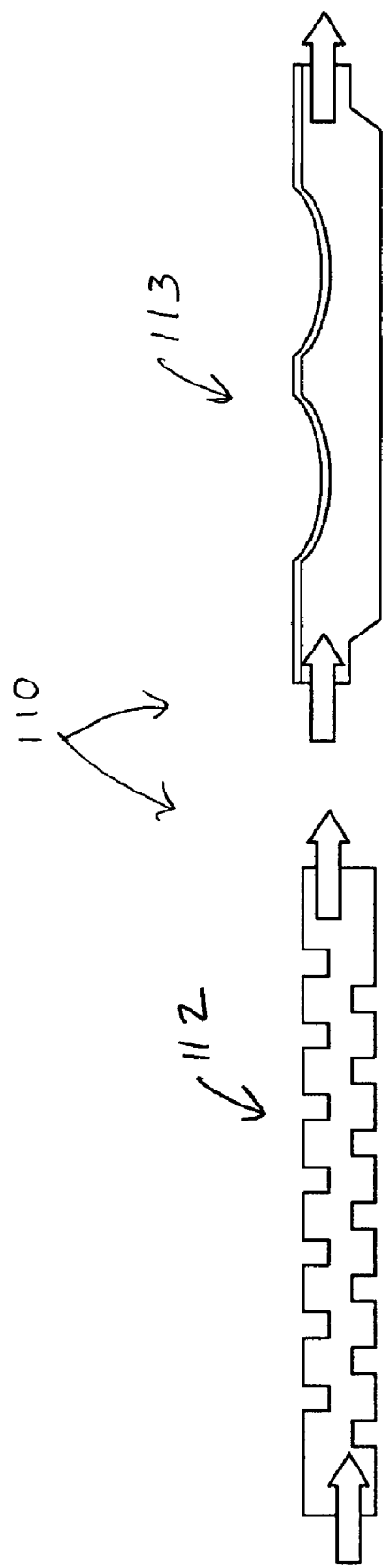
FIG. 11 is a simplified side cross-sectional view of exemplary design parameters for micromixers, e.g. a diffuser and kneader.

Two types of mixers 110 or reaction chamber were constructed as shown in FIG. 11. These included (1) a passive, diffuser-based mixing geometry 112, and (2) a two-diaphragm kneading chamber 113. Critical design parameters of each device (diaphragm size, chamber size/shape, orifice sizes, etc.) were varied for each type of chamber.

Figure 12:
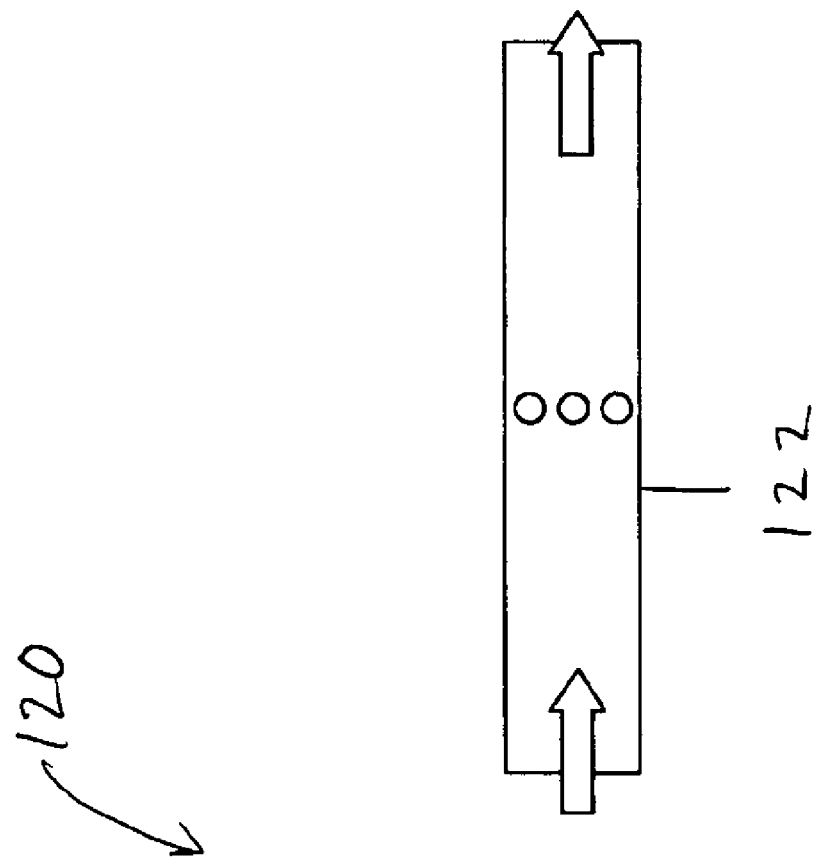
FIG. 12 is a simplified side cross-sectional view of some design parameters for microseparators, e.g. "T" separator and grids.

Two types of common separators 120 were constructed as shown in FIG. 12. These included (1) a "T" separator 121 and (2) grids 122 (mechanical filters). Critical design parameters of each device (entry angle, channel width, etc.) were varied for each type of separator. Actuation was performed externally.

All of these components were chosen because they represent the most likely elements to be integrated within a polymer microfluidic chip 12. In all cases, the materials used to build the components were also varied. The materials selection will be based partly on the type of device build studied. However, it is to be expressly understood that the invention is not limited by the types of components studied, the parameters varied or the materials which were chosen in the study.

Many variations of common microfluidic components were designed, built and tested according to the invention. The biochips were generally a standard size (2"×2") and accommodated several test devices on each. A material used to build the devices was PDMS (polydimethylsiloxane) due to its popularity for building microfluidic chips. Polyurethanes, epoxies, and other common polymers were also tested. After manufacture, chips 12 were characterized for relevant properties including features sizes, side wall geometries, surface roughness, surface charge, surface hydrophobicity, and mechanical properties of the material. The parameters of devices which could be studied is nearly uncountable and this listing is not to be understood in any sense to be exhaustive and is merely illustrative.

Figure 4:
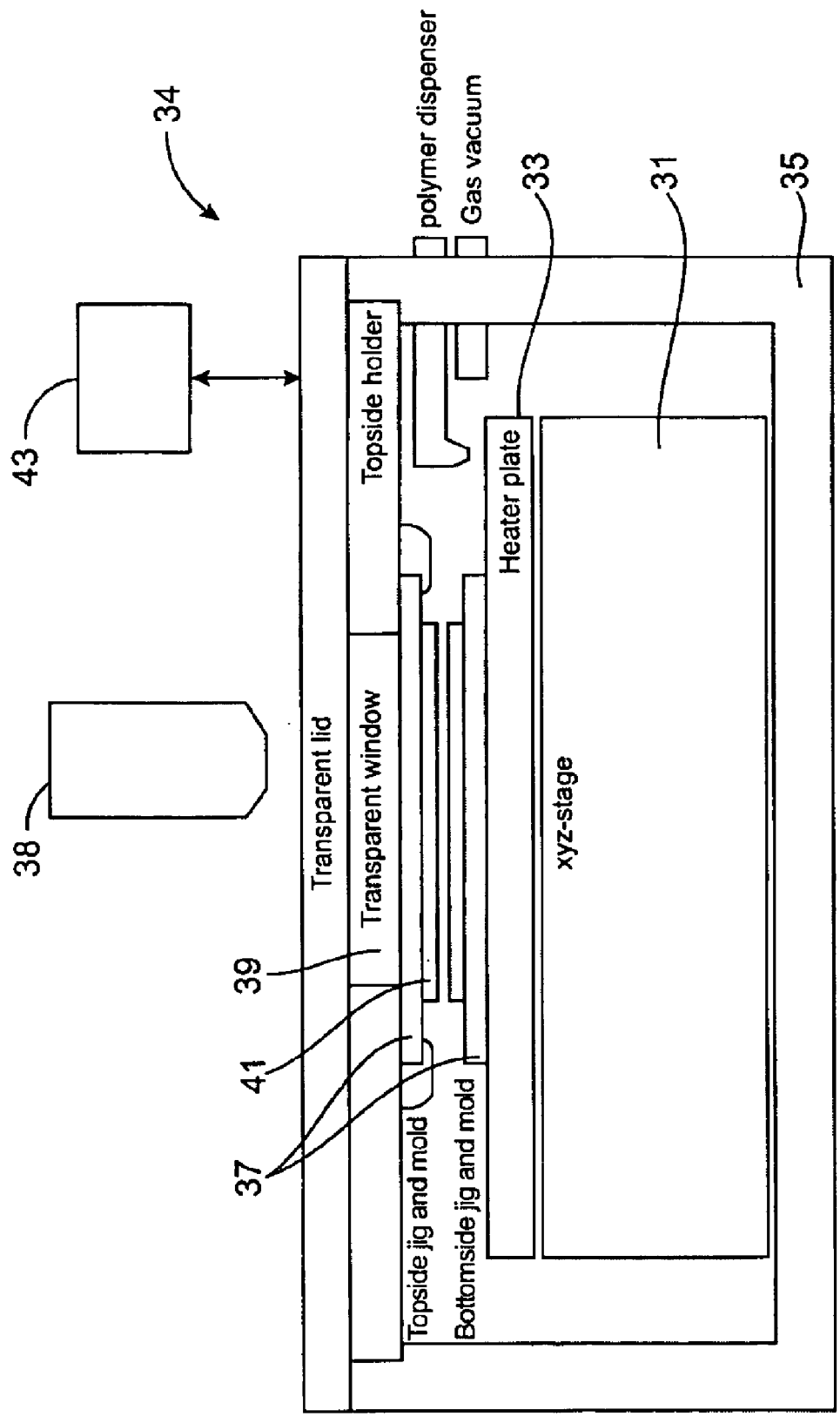
FIG. 4 is a simplified diagram of a semi-automatic molding tool for rapid prototyping of polymer fluidic chips. All active elements are computer controlled, including polymer dispensing, vacuum, stage, pressure plate, and heaters.

Therefore, the invention includes a computer controlled molding assembly 34 which will allow us to develop a semi-automated molding process. A diagrammatic sketch of this tool 34 (the "moldstation") is shown in FIG. 4. Basically, the molding assembly combines several separate tools into one computer controlled unit. These are a vacuum oven 35, a hot plate 33, a liquid polymer injection system, and a variety of jigs 37 for alignment and proper mating between top and bottom molds. The operator will control the placement of the molds by optical alignment through an inspection microscope 38, then initiate a computer controlled sequence of molding steps. This speeds up the process of prototyping and also results in more accurately fabricated pieces.

Fortunately, most of this work can be automated through the use of specially designed jigs 37 and computer controlled servos and heaters to align mold pieces 41. Station 34 of FIG. 4 includes an xyz stage 31 and a computer controlled hotplate 33. These are housed in a vacuum vessel 35 to allow for the generation of vacuum or introduction of inert or compressed gas during processing. The semi-automated molding station 34 performs most of the operations described above according to preprogrammed instructions. A fabrication technician will use an attached inspection scope 38 to align the mold pieces 41 on jigs 37 viewed through window 39 before initiating a fabrication sequence.

5. The Resulting Library of Data

The successful completion of this program has resulted in a large set of quantitative data. For each test chip 12, flow maps were generated from the data and compared directly (where possible) with expectations from Navier-Stokes law or from modeling results and with the calibration fluid. Deviations from the ideal situation were noted, and explored in detail.

To aid in the search for correlations as design parameters were adjusted, the data is collected in a database of "ntuples". Ntuples refer to n-dimensional data matrices which can be conveniently manipulated, histogrammed and plotted to search for correlations and trends. Phenomenological trends, such as shear flow vs. pressure vs. component geometry were extracted.

Figure 14:
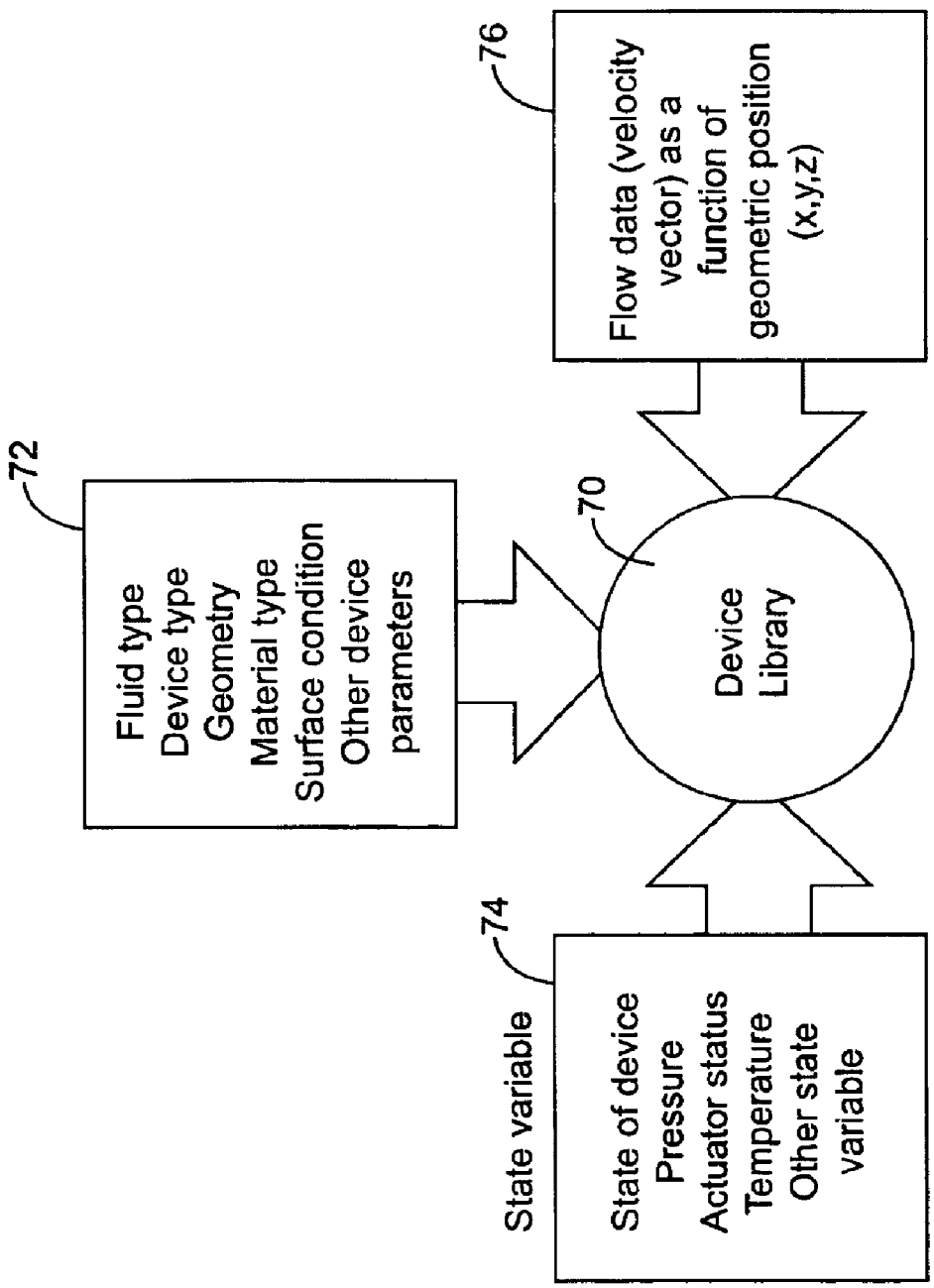
FIG. 14 is a diagram showing functional workings of a device library.

The data from many measurements over many different test chips 12 was collected, corrected, reduced, and analyzed for trends and correlations. The data was tabulated for each type of device (and fluid type) and presented in the form of "device libraries" 70. Such a library 70 represents an empirical multidimensional transfer function, as depicted in FIG. 14. For a given device type 72, state, and condition 74, the device library 70 describes the flow in and near the device as output 76. Data and device libraries 70 were prepared for the following devices: channels, vias, valves, pumps, mixers, and separators. These will contain data for both an ideal fluid (water) and human blood. These device libraries 70 allow software developers to test their algorithms by direct comparison to our data. Device designers may also use the libraries 70 to aid in their design. Since each library 70 contains all the necessary information regarding the conditions of the run, a third-party developer is able to electronically reproduce a virtual experiment for direct comparison. These data files should aid the development of mature, accurate microfluidic modeling and simulation CAD tools.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

We claim:

1. A system for non-invasive metrology of non-ideal fluids comprising:
   a microfluidic chip having design parameters of interest;
   fluid delivery means to deliver fluid to the microfluidic chip at selected design conditions;
   means to employ either one of Optical Doppler Tomography or Optical Coherent Tomography to measure flow characteristics in the microfluidic chip; and
   means to record subsequent flow data and using the flow data to predict flow properties of a non-ideal fluid of interest.

2. The system of claim 1, further comprising a computer to control the system for non-invasive metrology of non-ideal fluids and a microscope for inspection of the system.

3. The system of claim 1, further comprising one or more actuators that affect fluid flow at predetermined locations on the microfluidic chip.

4. The system of claim 1, further comprising a motorized stage platform to support the microfluidic.

5. The system of claim 1, wherein the fluid delivery means comprises:
   a fluid reservoir;
   a pump assembly to provide a pressurized fluid source; and
   one or more fluidic probes each having a micropressure transducer for monitoring fluid pressure.

6. The system of claim 1, wherein the means to employ either one of Optical Doppler Tomography or Optical Coherent Tomography to measure flow characteristics in the microfluidic chip comprises a probe on a robotic arm.

7. A method of compiling fluid flow data useful in predicting and monitoring properties of non-ideal fluids comprising:
   providing a microfluidic chip specially designed with non-variable parameters of interest;
   loading the microfluidic chip with a non-ideal fluid of interest;
   recording flow data of interest;
   recording the chip non-variable parameters of interest;
   recording and changing chip variable parameters of interest; and
   recording subsequent flow data and using the flow data to predict flow properties of said non-ideal fluid of interest.

8. The method of claim 7, wherein the chip non-variable parameters of interest include: fluid type, device type, geometry, material type, and surface condition.

9. The method of claim 7 wherein the flow data of interest includes velocity vector information.

10. The method of claim 7 wherein the chip variable parameters of interest includes: state of the chip, pressure, actuator status, and temperature.

* * * * *

UNITED STATES PATENT AND TRADEMARK OFFICE
CERTIFICATE OF CORRECTION

| | | |
|---|---|---|
| PATENT NO. | : 6,868,347 B2 | Page 1 of 1 |
| APPLICATION NO. | : 10/393109 | |
| DATED | : March 15, 2005 | |
| INVENTOR(S) | : Guann-Pyng, Mark Bachman and Zhongping Chen | |

It is certified that error appears in the above-identified patent and that said Letters Patent is hereby corrected as shown below:

Column 1, after the title of the invention, please insert the following new paragraph:

--This invention was made with Government support under SPAWAR Contract No. N66001-01-C-8014 awarded by the U.S. Navy. The Government has certain rights in the invention.--

Signed and Sealed this

Eighth Day of July, 2008

JON W. DUDAS
*Director of the United States Patent and Trademark Office*